(12) United States Patent
Zheng et al.

(10) Patent No.: US 10,284,705 B2
(45) Date of Patent: May 7, 2019

(54) METHOD AND APPARATUS FOR CONTROLLING SMART DEVICE, AND COMPUTER STORAGE MEDIUM

(71) Applicant: TENCENT TECHNOLOGY (SHENZHEN) COMPANY LIMITED, Shenzhen (CN)

(72) Inventors: Tian Zheng, Shenzhen (CN); Sheng Tang, Shenzhen (CN); Hao Ye, Shenzhen (CN); Ni Su, Shenzhen (CN); Qian Wu, Shenzhen (CN); Difei Chen, Shenzhen (CN); Zhiping Wang, Shenzhen (CN); Tantan Zhang, Shenzhen (CN); Chao Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/934,630

(22) Filed: Mar. 23, 2018

(65) Prior Publication Data

US 2018/0213077 A1    Jul. 26, 2018

Related U.S. Application Data

(63) Continuation of application No. PCT/CN2017/071456, filed on Jan. 17, 2017.

(30) Foreign Application Priority Data

Feb. 2, 2016   (CN) .......................... 2016 1 0072698

(51) Int. Cl.
*H04L 12/28*   (2006.01)
*H04M 1/725*   (2006.01)
(Continued)

(52) U.S. Cl.
CPC ...... *H04M 1/72533* (2013.01); *G06F 1/1698* (2013.01); *G06F 3/0482* (2013.01); *H04L 12/2818* (2013.01); *H04L 12/4625* (2013.01)

(58) Field of Classification Search
CPC ...... G06F 3/0482; G06F 1/1698; G06F 3/167; G06F 21/31; G06F 2203/0381;
(Continued)

(56) References Cited

U.S. PATENT DOCUMENTS

2015/0205567 A1\* 7/2015 Seo ..................... G06F 9/445
                                                         345/2.3
2015/0317837 A1\* 11/2015 Sholudko .............. G06T 19/006
                                                         345/633
(Continued)

FOREIGN PATENT DOCUMENTS

CN    103713812    4/2014
CN    104267701    1/2015
(Continued)

OTHER PUBLICATIONS

International Search Report dated Mar. 31, 2017 in PCT/CN2017/071456 filed Jan. 17, 2017. (With English Translation).

*Primary Examiner* — Nathan S Taylor
(74) *Attorney, Agent, or Firm* — Oblon, McClelland, Maier & Neustadt, L.L.P.

(57) ABSTRACT

A method for controlling a smart device is described. The interface circuitry of a user device for controlling the smart device receives basic information of the smart device that enables a connection of the smart device into an Internet of Things network. A control signal is provided to the smart device via the interface circuitry to control, according to the basic information. The smart device is connected into the Internet of Things network. A preset function configuration of the smart device is obtained when the smart device is connected into the Internet of Things network. A control (Continued)

component is determined to enable a control of the smart device according to the preset function configuration. For a user interface, a controller template is generated to include the control component. The smart device is controlled based on an operation on the control component in the user interface.

18 Claims, 8 Drawing Sheets

(51) Int. Cl.
  *G06F 3/0482* (2013.01)
  *G06F 1/16* (2006.01)
  *H04L 12/46* (2006.01)
(58) Field of Classification Search
  CPC .......... G06F 2203/04806; G06F 3/005; G06F 3/011; G06F 3/017; G06F 3/0304; G06F 3/0481; G06F 3/0484; G06F 3/1454; G06F 3/16; G06F 8/61; G06F 9/445; G06F 9/451; G06F 9/453; H04L 12/2818; H04L 67/12; H04L 12/282; H04L 12/12; H04L 12/2803; H04L 12/2832; H04L 12/6418; H04L 2012/2841; H04L 2012/285; H04L 41/0833; H04L 63/0861; H04L 67/10; H04L 67/125; H04L 67/34; H04M 1/72533; H04W 4/70; H04W 12/06; H04W 4/80; H04W 12/08; H04W 4/60; H04W 76/14; H04W 88/02; H04W 88/16
  USPC ........................................................ 455/420
  See application file for complete search history.

(56) References Cited

U.S. PATENT DOCUMENTS

| | | | |
|---|---|---|---|
| 2015/0347114 A1* | 12/2015 | Yoon .................. | G06F 8/61 |
| | | | 235/375 |
| 2016/0135241 A1* | 5/2016 | Gujral ................ | H04W 4/70 |
| | | | 370/328 |
| 2016/0226674 A1* | 8/2016 | Kangshang .......... | G06F 3/0481 |
| 2017/0008162 A1* | 1/2017 | Tsubota .............. | G05B 19/00 |
| 2017/0287477 A1* | 10/2017 | Lu ...................... | G10L 15/22 |
| 2018/0012488 A1* | 1/2018 | Yi ....................... | B60N 2/56 |

FOREIGN PATENT DOCUMENTS

| | | |
|---|---|---|
| CN | 104536654 | 4/2015 |
| CN | 105137858 | 12/2015 |

\* cited by examiner

| Editing function | | |
|---|---|---|
| Function name | Temperature | ✓ |
| Data type | Integer (int) | ▽ |
| Visible to a user | ● Yes ○ No | |
| Function type | ● Display ○ Control | |
| Historical chart | ○ Display ● Not display | |
| Function description | XXXXX<br>1/200 | |

FIG. 2b

| Data type | Controller control | Data display control |
|---|---|---|
| Bool | Function name — Switch button<br>Function name — Switch button<br>Upload a picture — Operate a button<br>Quantity:1 [−][+] Stepper<br>Quantity:2 [−][+] | Value 1/unit 34.8  Value 2/unit 37.2<br>Value 3/unit 255  Value 4/unit 241<br>Numbers + low charts |
| Int/Float | Small ———— Large  Slider<br>Function name  Value/unit<br>Small ———— Large<br>Function name [Value ▼] - [Value ▼] Unit  Range selector<br>(Click to call a roller) | Value 1/unit 34.8  Value 2/unit 37.2<br>Value 3/unit 255  Value 4/unit 241<br>Chart name/unit  ● Link entry<br>Numbers + high charts |
| String | Function name [Input text] [Action]  Input box<br>Function name  Feature  Text display | Directly display on a control, for example:<br>Mode  Refrigeration ▼<br>Temperature setting  28 ▼<br>Mode  Comfort ▼ |
| Enum | Function name  Feature ▼  Selector<br>(Click to call a roller) | |
| URL | Function name  Feature ▶  Entry<br>(Click to call a new page) | |
| Time | Function name [Value ▼] - [Value ▼] Unit  Range selector<br>(Click to call a roller) | |

FIG. 2d

METHOD AND APPARATUS FOR CONTROLLING SMART DEVICE, AND COMPUTER STORAGE MEDIUM

RELATED APPLICATION

This application is a continuation of International Application No. PCT/CN2017/071456, filed on Jan. 17, 2017, which claims priority to Chinese Patent Application No. 201610072698.7, entitled "METHOD AND APPARATUS FOR CONTROLLING SMART DEVICE, AND COMPUTER STORAGE MEDIUM" filed on Feb. 2, 2016. The entire disclosures of the prior applications are hereby incorporated by reference in their entirety.

FIELD OF THE TECHNOLOGY

The present disclosure relates to the technical field of the Internet of Things, and in particular, to a method and an apparatus for controlling a smart device, and a computer storage medium.

BACKGROUND OF THE DISCLOSURE

Smart hardware transforms a conventional device by combining software with hardware, so that the smart hardware has an intelligent function. The smart hardware may also be referred to as a smart device, and at present extends from a wearable device to fields such as a smart television, a smart home, a smart automobile, and health care. After being intelligent, a device has a connection capability for loading Internet services, remote control becomes possible, a typical "cloud+end" architecture is formed, and additional values such as big data are provided. User demands that can be met by the smart device itself are limited. To implement an entire solution of the Internet of Things (IOT) that connects people to people, and things to things, it is necessary to rely on assistance of a smart phone and cloud data storage. However, to complete the entire solution, a lot of manpower needs to be input to complete design manufacture and control binding of a device controller (also referred to as a mobile end controller), and joint binding and cloud deployment of massive user data.

At present, most hardware vendors manufacture the mobile end controller by themselves, and independently develop and complete binding between device data and the controller, so that the controller can control a smart device; and then singly attempt, according to Wiki guidelines, to implement joint collaboration between the device and the controller, and connection between the data and a cloud server, so as to provide one-to-one connection debugging by using the IOT to ensure joint success.

In a research and practice process of a related technology, the inventor of the present disclosure finds that because the mobile end controller is independently developed and completed by vendors, problems of lack of a uniform test system, and low compatibility during multi-device control may be caused.

SUMMARY

The objective of the present disclosure is to provide a method and an apparatus for controlling a smart device, and a computer storage medium, so as to ensure unification between a mobile end controller and a test system, and improve compatibility of multi-device control.

A method for controlling a smart device is described. Interface circuitry of a user device for controlling the smart device receives basic information of the smart device that enables a connection of the smart device in an Internet of Things network. A control signal is provided to the smart device via the interface circuitry to control, according to the basic information, the smart device to connect into the Internet of Things network. A preset function configuration of the smart device is obtained when the smart device is connected into the Internet of Things network. A control component to enable a control of the smart device is determined according to the preset function configuration. For a user interface, a controller template is generated to include the control component. The smart device is controlled based on an operation on the control component in the user interface.

To obtain the preset function configuration of the smart device, in some embodiments, a function configuration list corresponding to the smart device is determined, and a data type based on the function configuration list is determined. Then, the control component is determined according to the data type.

To determine the function configuration list corresponding to the smart device, in some embodiments, in a preset function database, a public function configuration is obtained. The public function configuration is common to the smart device and other smart devices. Further, a particular function configuration that is specific for the smart device is obtained. The public function configuration and the particular function configuration are combined to generate the function configuration list.

To determine the data type based on the function configuration list, in some embodiments, a function type that is indicated by the function configuration list is determined. In an example, the data type of the function is determined when the function type is determined to be a control type. In another example, historical data of the smart device is obtained when the function type is determined to be a data display type, and the data type is determined based on the historical data.

In some embodiments, before the function type is determined, whether a function indicated in the function configuration list is visible to a user is determined. When the function is determined to be visible to the user, the function type is determined. When the function is determined to be invisible to the user, the function is hided from the user.

In some embodiments, a data type set that is a combination of one or more of Bool, Int, Float, String, Enum, URL, and Time is determined. Then, the data type set is parsed according to a preset rule, to determine the control component.

In an example, after the controller template is generated based on the controller control, an adjustment instruction is received. Then, attribute adjustment of the controller template is performed according to the adjustment instruction.

Aspects of the disclosure provide a non-transitory computer-readable medium storing instructions which when executed by a computer cause the computer to perform any of the methods for controlling a smart device, as described above.

Aspects of the disclosure provide an apparatus for controlling a smart device. The apparatus includes interface circuitry and processing circuitry. The interface circuitry is configured to receive information from the smart device and transmit control signals to the smart device. The processing circuitry is configured to receive, via the interface circuitry, basic information of the smart device. The basic information enables a connection of the smart device into an Internet of Things network. Further, the processing circuitry provides a control signal to the smart device via the interface circuitry to control, according to the received information, the smart device to connect into the Internet of Things network. Then, the processing circuitry obtains a preset function configuration of the smart device when the smart device is connected into the Internet of Things network. Further, the processing circuitry determines a control component to enable a control of the smart device according to the preset function configuration. Additionally, the processing circuitry generates, for a user interface, a controller template that includes the control component, and controls the smart device based on an operation on the control component in the user interface.

Compared with the related technology, in the embodiments of the present disclosure, a smart device is first controlled to be connected to the Internet of Things network according to basic information of the smart device; preset function configuration information corresponding to the smart device is obtained in a status of the smart device being connected to the Internet of Things network, to determine a corresponding controller control; then a controller template corresponding to the smart device is generated based on the determined controller control, and finally the smart device is controlled by using the controller template. That is, in the embodiments of the present disclosure, the controller template is automatically and uniformly generated based on the function configuration information corresponding to the smart device, thereby completing data interconnection between the smart device and the controller template, so that unification between a controller and a test system is ensured, and compatibility of multi-device control is further improved.

BRIEF DESCRIPTION OF THE DRAWINGS

The following describes specific implementation manners of the present disclosure in detail with reference to the accompanying drawings, to illustrate the technical solutions and other beneficial effects of the present disclosure.

FIG. 2b to FIG. 2e are a schematic diagram of steps or interface parsing in the method for controlling a smart device according to Embodiment 2 of the present disclosure.

DESCRIPTION OF EMBODIMENTS

Figure 1A:
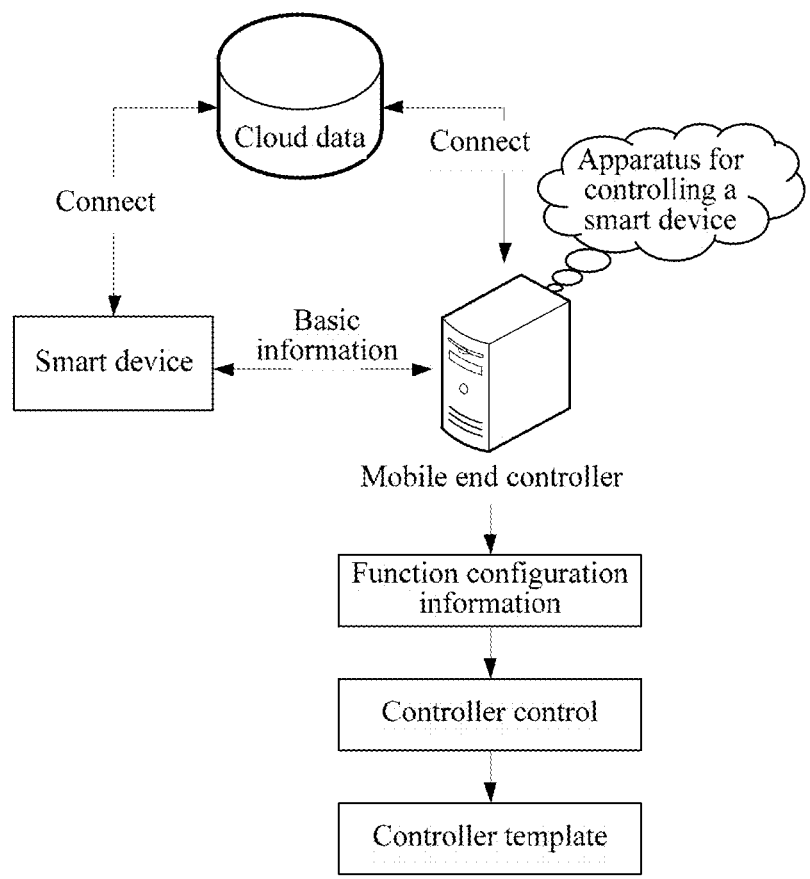
FIG. 1a is a schematic scenario diagram of a system for controlling a smart device according to an embodiment of the present disclosure.

Referring to the drawings, same component symbols represent same components. A principle of the present disclosure is described by using examples in which the present disclosure is implemented in proper computing environments. The following descriptions are specific embodiments of the present disclosure based on the examples, and should not be construed as a limitation to other specific embodiments of the present disclosure that are not described herein in detail.

In the description below, the specific embodiments of the present disclosure will be described with reference to steps and signs that are performed by one or more computers, unless indicated otherwise. As such, such steps and operations, which are at times referred to as being computer-executed, include the operation by the processing unit of the computer of electrical signals representing data in a structured form. This operation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the present disclosure is being described in the foregoing context, it is not meant to be limiting as those of skill in the art will appreciate that various steps and operations described hereinafter may also be implemented in hardware. A term "module" used in the specification may be regarded as a software object executed in the calculation system. Different components, modules, engines, and services described in the specification may be regarded as objects implemented in the calculation system. The apparatus and method described in the specification is, in an example, implemented in a form of software, and definitely can be implemented in a form of hardware, both of which fall within the protection scope of the present disclosure.

The embodiments of the present disclosure provide a method and an apparatus for controlling a smart device.

Referring to FIG. 1a, FIG. 1a is a schematic scenario diagram of a system for controlling a smart device according to an embodiment of the present disclosure. The system is a resource scheduling system that may include a smart device, a cloud server, and a mobile end controller. The smart device, the mobile end controller, and the cloud server are mutually connected. An apparatus for controlling a smart device may be integrated in the mobile end controller, and is mainly configured to obtain basic information of the smart device, such as a name, a type, a model number, or a device icon; and control, according to the basic information, the smart device to be connected to the Internet of Things network; obtain, in a status of the smart device being connected to the Internet of Things network, corresponding preset function configuration information such as a type of data transmitted by the device; then determine a corresponding controller control such as a data display type control and a control type control according to the function configuration information; and finally generate a controller template based on the controller control, and control the smart device by using the controller template.

The following provides detailed description separately.

Embodiment 1

In this embodiment, an apparatus for controlling a smart device is described. The apparatus for controlling a smart device may be specifically integrated in a network device such as a server or a gateway.

A method for controlling a smart device includes: obtaining basic information of the smart device, and controlling, according to the basic information, the smart device to be connected to the Internet of Things network; obtaining corresponding preset function configuration information in a status of the smart device being connected to the Internet of Things network; determining a corresponding controller control according to the function configuration information;

and generating a controller template based on the controller control, and controlling the smart device by using the controller template.

Figure 1B:
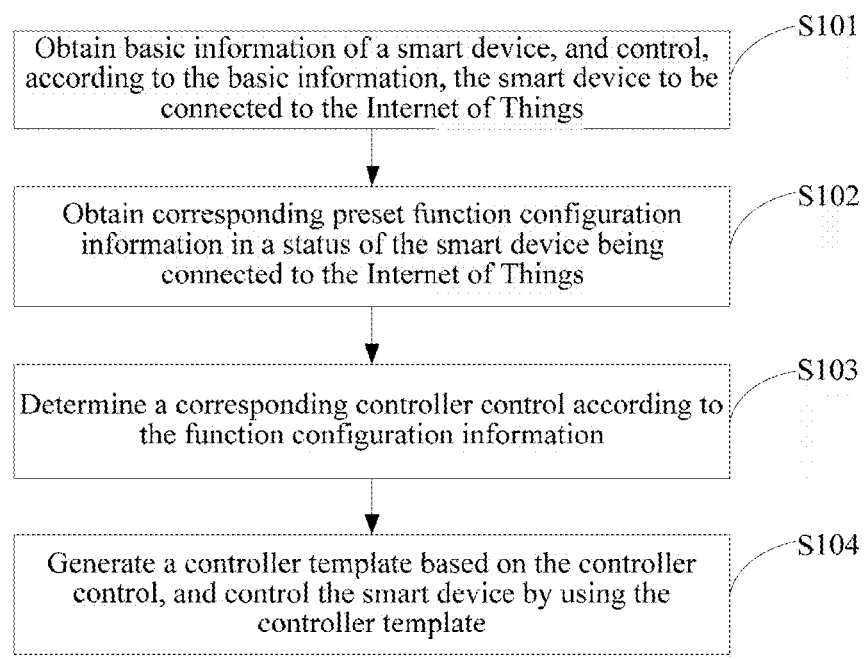
FIG. 1b is a schematic flowchart of a method for controlling a smart device according to Embodiment 1 of the present disclosure.

Referring to FIG. 1b, FIG. 1b is a schematic flowchart of a method for controlling a smart device according to Embodiment 1 of the present disclosure. The method includes the following steps:

Step S101: Obtain basic information of the smart device, and control, according to the basic information, the smart device to be connected to the Internet of Things network.

It may be understood that, the basic information of the smart device may specifically include a name, a type, a model number, a device icon, device description, and device debugging information, such as an operating system, an integration solution, public key information, a link manner, or a distribution network manner.

The smart device may also be referred to as smart hardware, and at present extends from a wearable device to fields such as a smart television, a smart home, a smart automobile, and health care. Further, joint collaboration between the smart device and the Internet of Things network may be automatically completed according to the basic information by using a specified terminal application of the Internet of Things network.

Step S102: Obtain corresponding preset function configuration information in a status of the smart device being connected to the Internet of Things network.

Step S103: Determine a corresponding controller control according to the function configuration information.

Step S102 and step S103 may be specifically:

In an example, the obtaining corresponding preset function configuration information in a status of the smart device being connected to the Internet of Things network may include:

Step 1: Determine a function configuration list corresponding to the smart device.

Step 2: Traverse the function configuration list.

Step 3: Determine a corresponding data type based on a traversal result.

That is, for each smart device, a function configuration list needs to be configured correspondingly. The function configuration list includes a function that the smart device is provided with. It may be understood that, whether the function is needed may be determined according to check of a user.

Further, for example, the preset function configuration information may specifically be a data type determined according to the function configuration list, that is, the function configuration list is traversed to determine a corresponding data type. Based on this, the determining a corresponding controller control according to the function configuration information (step S103) may include: determining the corresponding controller control according to the data type.

Further, the determining a function configuration list corresponding to the smart device (step 1) may be specifically as follows:

Step 1(1): Obtain, in a preset function database, a public function configuration and a particular function configuration that are corresponding to the smart device.

Step 1(2): Combine the public function configuration and the particular function configuration to generate the corresponding function configuration list.

That is, for each smart device, a public function and a particular function may be set correspondingly. The public function is some basic function prepared in advance by a system, such as "sending device information by using an application of a mobile phone Q", and "standby/starting a device". However, the particular function requires a vendor to fill in data interface information, which may include: a function name, a data type, whether the function is visible to a user (yes, no), a function type (display, control), a historical data chart (display, not display), function description, and/or the like.

For example, the preset function database is first pulled. A public function list (that is, public function configuration) corresponding to a device type and a particular function list (particular function configuration) corresponding to the device type are pulled in the preset function database. Then, the public function configuration and the particular function configuration are combined to generate a corresponding function configuration list. Finally, the function configuration list is traversed to determine a data type of function data.

It may be understood that, the determining a corresponding data type based on a traversal result (step 3) varies, and for example, may specifically include:

Step 3(1): Determine that a function type of a function indicated in the function configuration list is a control type or a data display type.

That is, functions (including a public function and a particular function) indicated in the function configuration list are traversed, so as to determine its function type is a control type or a data display type.

Further, for example, a type of a corresponding display control may be determined according to the function type. The control type control may specifically include a switch button, a selector, a slider, and/or the like. A data display type control includes chart display, text display, and/or the like.

Step 3(2): Determine the data type of the function if it is determined that the function type of the function indicated in the function configuration list is the control type.

Then, the data type may be parsed to determine the corresponding controller control.

Step 3(3): Obtain historical data of the smart device if it is determined that the function type of the function indicated in the function configuration list is the data display type, and determine a data type of the historical data.

In this embodiment of the present disclosure, the determining a data type of the historical data may specifically include:

determining the data type of the historical data in a preset data type set, where the data type set includes one or a combination of more than two of Bool, Int, Float, String, Enum, URL, and Time; and each piece of historical data corresponds to a data type.

Based on this, the determining a corresponding controller control according to the data type may be specifically: parsing the data type according to a preset rule, to determine the corresponding controller control.

Optionally, before the determining that a function type of a function indicated in the function configuration list is a control type or a data display type (step 3(1)), the method may further include:

Step a: Determine whether the function indicated in the function configuration list is visible to a user;

Step b: Trigger, if it is determined that the function indicated in the function configuration list is visible to the user, to perform the step of determining that a function type of a function indicated in the function configuration list is a control type or a data display type (step 3(1)).

Step c: Hide the function if it is determined that the function indicated in the function configuration list is invisible to the user.

That is, whether the functions (including the public function and the particular function) indicated in the function configuration list are visible to the user may be determined according to default settings or according to vendor settings. That is, whether the functions are needed is determined. If the functions are visible to the user, determine that the function type is a control type or a data display type; and if the functions are invisible to the user, hide the functions.

Step S104: Generate a controller template based on the controller control, and control the smart device by using the controller template.

For example, the controller control determined according to each type of data transmitted by the smart device may form a controller template corresponding to the smart device, so as to control the smart device by using the controller template, to complete data interconnection between the smart device and the controller template.

It may be understood that, after the generating a controller template based on the controller control, the method may further include:

(1) Obtain an adjustment instruction.
(2) Perform attribute adjustment on the controller template according to the adjustment instruction.

That is, after the controller template is generated, the user may further perform personalized modification on attributes such as a pattern, sorting, and color changing of a control, and may also add or configure new attributes, and/or the like.

In this embodiment of the present disclosure, for example, a platform system may be configured as a generation transit station of the controller template. After each type of data transmitted by the smart device is determined, the system may automatically generate the controller template. The three nodes: the smart device, the controller template, and the cloud server are interconnected.

As can be known from the foregoing, in the method for controlling a smart device provided in this embodiment, first a smart device is controlled to be connected to the Internet of Things network according to basic information of the smart device; preset function configuration information corresponding to the smart device is obtained in a status of the smart device being connected to the Internet of Things network, to determine a corresponding controller control; then a controller template corresponding to the smart device is generated based on the determined controller control, and finally the smart device is controlled by using the controller template. That is, in this embodiment of the present disclosure, the controller template is automatically and uniformly generated based on the function configuration information corresponding to the smart device, thereby completing data interconnection between the smart device and the controller template, so that unification between a controller and a test system is ensured, and compatibility of multi-device control is further improved.

Embodiment 2

According to the method described in Embodiment 1, the following provides further detailed description by using examples.

Figure 2A:
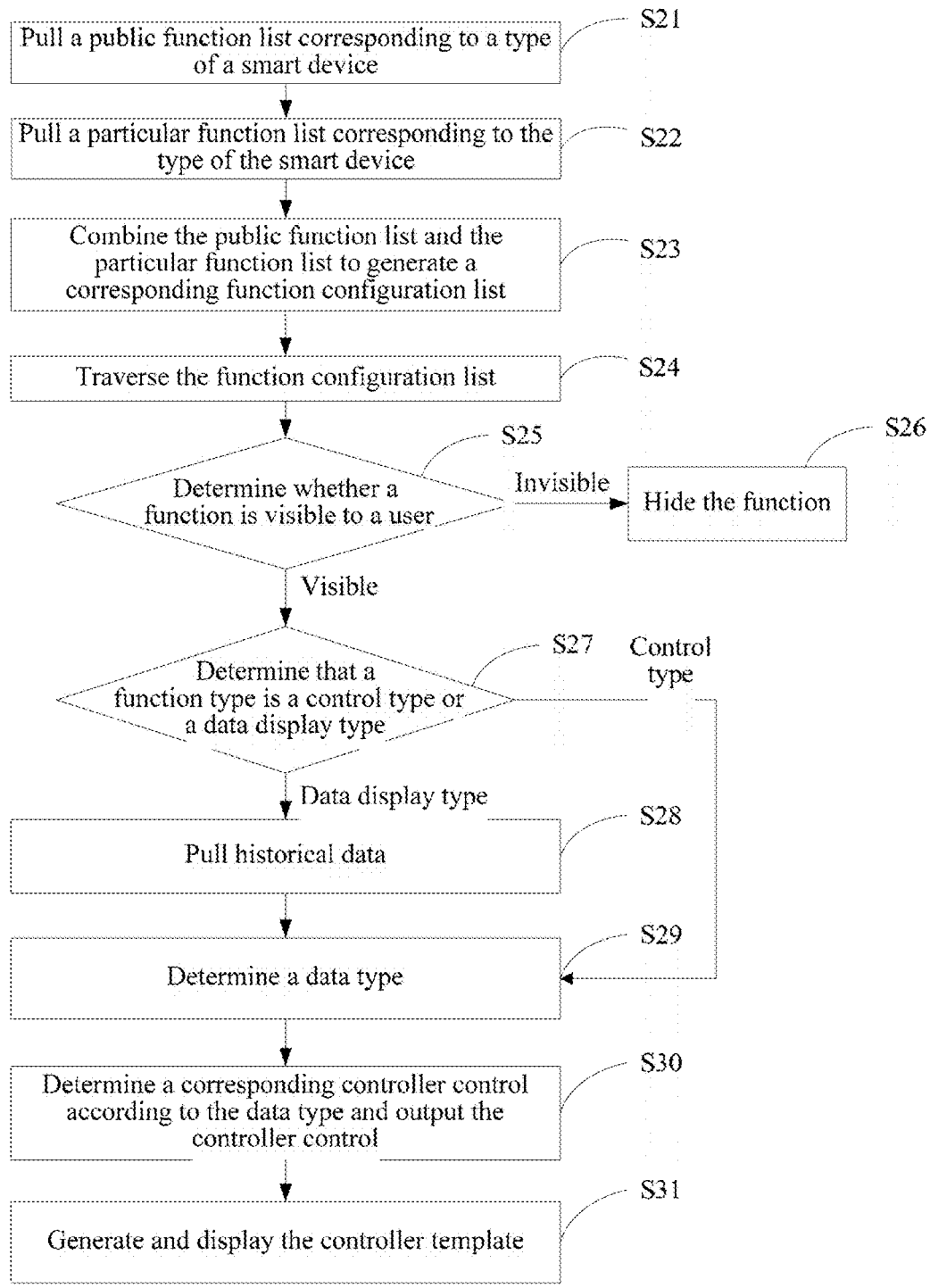
FIG. 2a is a schematic flowchart of a method for controlling a smart device according to Embodiment 2 of the present disclosure.

FIG. 2a is a schematic flowchart of a method for controlling a smart device according to Embodiment 2 of the present disclosure. In the method for controlling a smart device provided in this embodiment of the present disclosure, a platform system may be configured as a generation transit station of a controller template. After each type of data transmitted by the smart device is determined, the system may automatically generate the controller template. The three nodes: the smart device, the controller template, and the cloud server are interconnected. The controller template also supports personalized modification such as pattern selection, sorting, and color changing of a control, so as to ensure brand style unification, and further ensure compatibility improvement of multi-device control.

As shown in FIG. 2a, the process of the method for controlling a smart device may include:

S21: Pull a public function list corresponding to a type of the smart device.

S22: Pull a particular function list corresponding to the type of the smart device.

S23: Combine the public function list and the particular function list to generate a corresponding function configuration list.

It may be understood that, before the public function list corresponding to the type of the smart device is pulled, the system needs to control, according to the basic information of the smart device, the smart device to be connected to the Internet of Things network.

Specifically, for example, public function lists and particular function lists corresponding to multiple device types may be set in the system to form a function database, and the corresponding public function lists and particular function lists are pulled according to basic information of a connected smart device.

The public function list includes public functions such as "sending device information by using an application of a mobile phone Q", and "standby/starting a device". The particular function requires a vendor to fill in data interface information, which may include: a function name, a data type, whether the function is visible to a user (yes, no), a function type (display, control), a historical data chart (display, not display), function description, and/or the like, and may be an editing interface for filling in a particular function through a data interface, as shown in FIG. 2b.

Then, the system combines the public function list and the particular function list to generate a function configuration list corresponding to a smart terminal.

S24: Traverse the function configuration list.
S25: Determine whether a function is visible to a user.
S26: Hide the function if the function is invisible.
S27: Determine that a function type is a control type or a data display type if the function is visible.
S28: Directly perform S29 if the function type is the control type; and pull historical data if the function type function type is the data display type.

For example, whether the public function and the particular function in the function configuration list are visible to the user may be determined according to default settings or according to vendor settings. That is, whether the functions are needed is determined. If the functions are visible to the user, determine that the function type is a control type or a data display type; and if the functions are invisible to users, hide the functions.

A type of a corresponding display control may be determined according to the function type. The control type control may specifically include a switch button, a selector, a slider, and/or the like. A data display type control includes chart display, text display, and/or the like.

S29: Determine a data type.
S30: Determine a corresponding controller control according to the data type and output the controller control.
S31: Generate and display the controller template.

It may be understood that, the data type of the historical data may be determined in a preset data type set, where the data type set includes one or a combination of more than two of Bool, Int, Float, String, Enum, URL, and Time; and each piece of data corresponds to a data type.

Further, after the function configuration list is traversed to determine the corresponding data type, each data type may be parsed according to a preset rule, to determine the corresponding controller control.

Figure 2C:
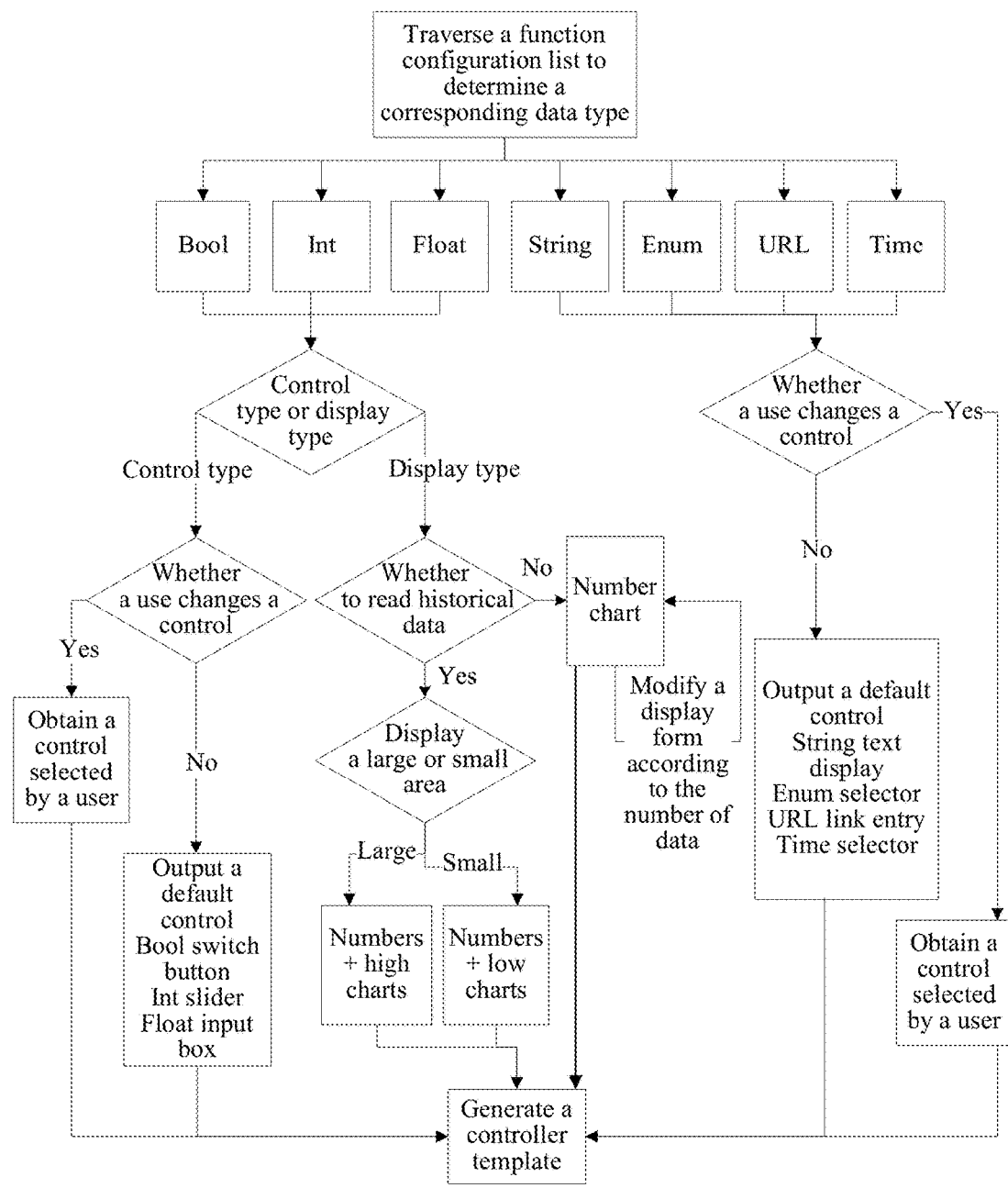

Specifically, for example, FIG. 2c is a schematic flowchart of parsing each data type according to a preset rule, and determining a corresponding controller control. When the data type is Bool, Int, or Float, determine the type as control type or display type.

On one hand, if the function type is the control type, determine whether the user changes the control; if the user needs to change the control, obtain a control selected by the user; and if the user does not need to change the control, the system outputs a default control.

For example, FIG. 2d is a schematic diagram of a correspondence between a data type and a control. Bool data is set to output a switch button, an operation button, or a stepper by default, Int data is set to output a slider or a range selector by default, and String data is set to output an input box or text display by default.

On the other hand, if the function type is the data display type, determine whether to read historical data. If it is to read the historical data, determine that a display area is a large area or a small area. If the display area is the large area, use a display manner of numbers and high charts; if the display area is the small area, use a display manner of numbers and low charts, as shown in FIG. 2d. If it is to not read the historical data, a current value is directly displayed. A display form may be modified according to the currently read value. For example, if only a value of today's temperature needs to be displayed, the value is displayed in a corresponding display form. If multiple values such as temperature, humidity, and a pollution index need to be displayed, the values are also displayed in corresponding display forms, and the like.

In addition, when the data type is String, Enum, URL, or Time, determine whether the user changes the control; if the user needs to change the control, obtain a control selected by the user; and if the user does not need to change the control, the system outputs a default control.

For example, as shown in FIG. 2d, String data is set to output an input box or text display by default, Enum data is set to output a selector by default, URL data is set to output a link entry by default, and Time data is set to output a time range selector by default.

Finally, the controller template is generated and displayed according to a control output by default, and/or a control selected by the user, and/or a number chart. Further, the vendor may perform necessary attribute configuration (for example, minimum/maximum volume) as required.

Figure 2E:
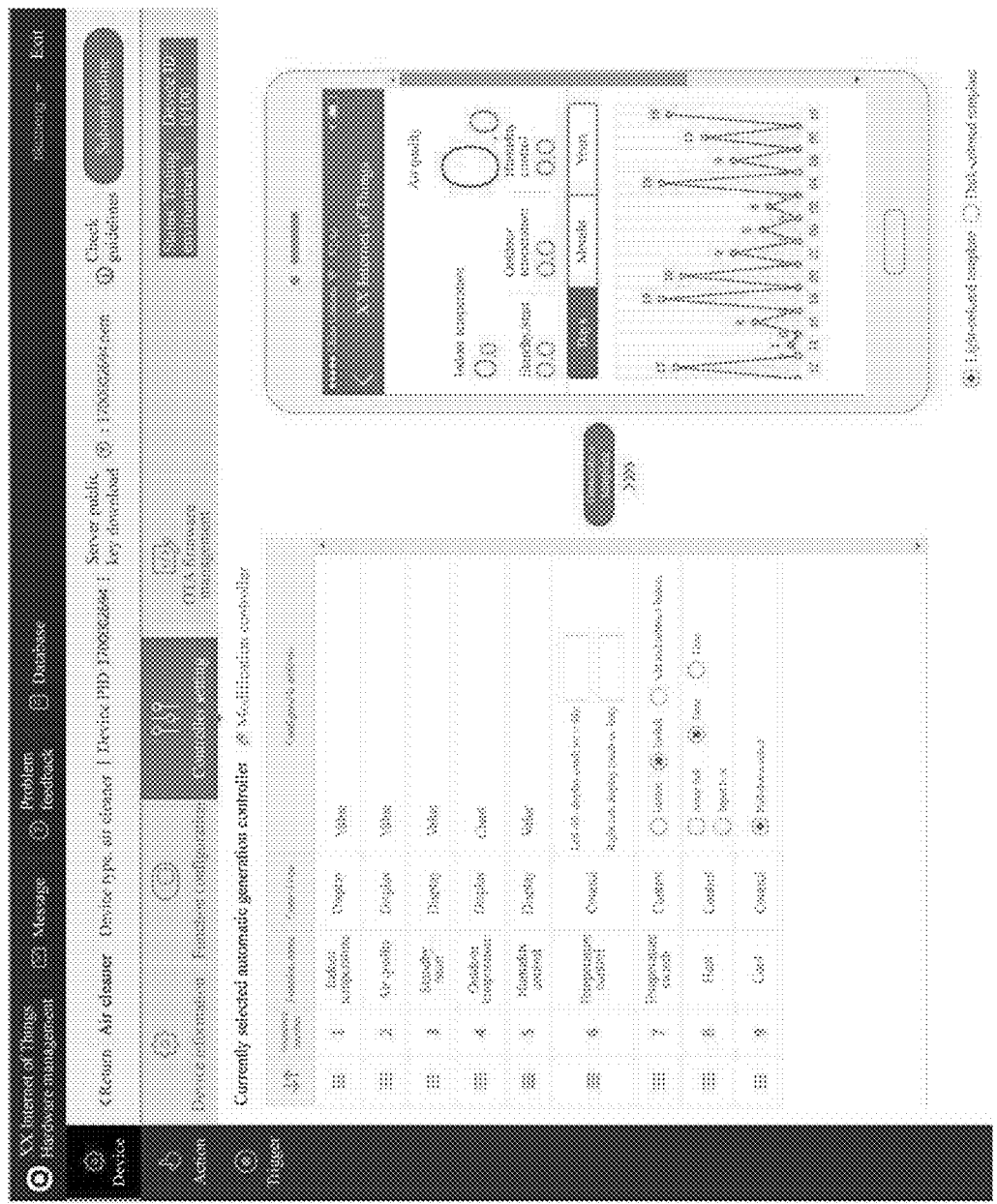

In some implementation manners, the vendor may perform functions such as page layout adjustment and skin changing as required, that is, may perform personalized modification such as pattern selection, sorting, and color changing of a control. FIG. 2e is a schematic interface diagram of an adjustment layout and a pattern of a controller template. The left side is a setting interface of each control, and the right side is a display interface of a user terminal.

As can be known from the foregoing, in the method for controlling a smart device provided in this embodiment, first a smart device is controlled to be connected to the Internet of Things network according to basic information of the smart device; preset function configuration information corresponding to the smart device is obtained in a status of the smart device being connected to the Internet of Things network, to determine a corresponding controller control; then a controller template corresponding to the smart device is generated based on the determined controller control, and finally the smart device is controlled by using the controller template. That is, in this embodiment of the present disclosure, the controller template is automatically and uniformly generated based on the function configuration information corresponding to the smart device, thereby completing data interconnection between the smart device and the controller template, so that unification of a controller between a test system is ensured, and compatibility of multi-device control is further improved.

Embodiment 3

To better implement the method for controlling a smart device provided in the embodiments of the present disclosure, this embodiment of the present disclosure further provides an apparatus based on the foregoing method for controlling a smart device. The meanings of terms are the same as those in the foregoing method for controlling a smart device, reference may be made to the description in the method embodiment for specific implementation details.

Figure 3:
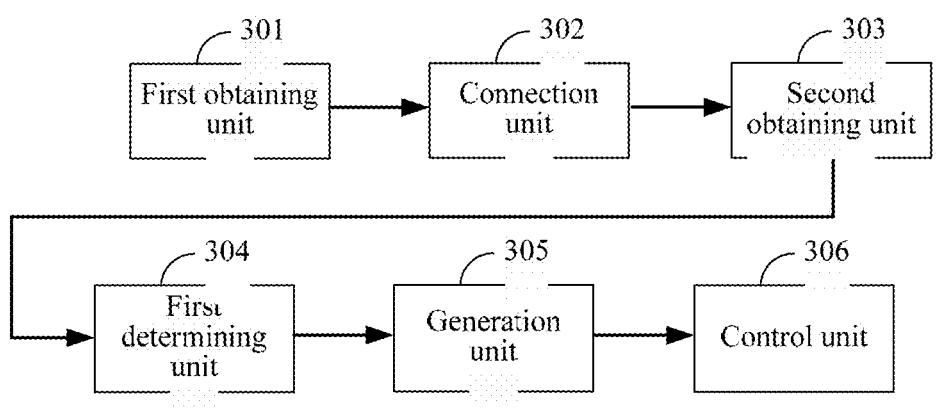
FIG. 3 is a schematic structural diagram of an apparatus for controlling a smart device according to Embodiment 3 of the present disclosure.

FIG. 3 is a schematic structural diagram of an apparatus for controlling a smart device according to this embodiment of the present disclosure. The apparatus for controlling a smart device may include a first obtaining unit 301, a connection unit 302, a second obtaining unit 303, a first determining unit 304, a generation unit 305, and a control unit 306.

The first obtaining unit 301 is configured to obtain basic information of the smart device.

It may be understood that, the basic information of the smart device may specifically include a name, a type, a model number, a device icon, device description, and device debugging information, such as an operating system, an integration solution, public key information, a link manner, or a distribution network manner.

The smart device may also be referred to as smart hardware, and at present extends from a wearable device to fields such as a smart television, a smart home, a smart automobile, and health care. Further, joint collaboration between the smart device and the Internet of Things network may be automatically completed according to the basic information by using a specified terminal application of the Internet of Things network.

The connection unit 302 is configured to control, according to the basic information, the smart device to be connected to the Internet of Things network. The second obtaining unit 303 is configured to obtain corresponding preset function configuration information in a status of the smart device being connected to the Internet of Things network. The first determining unit 304 is configured to determine a corresponding controller control according to the function configuration information.

In an example, the second obtaining unit 303 may include:

1. a first determining subunit, configured to determine a function configuration list corresponding to the smart device;

2. a traversal subunit, configured to traverse the function configuration list; and 3. a second determining subunit, configured to determine a corresponding data type based on a traversal result. That is, for each smart device, a function configuration list needs to be configured correspondingly. The function configuration list includes a function that the smart device is provided with. It may be understood that, whether the function is needed may be determined according to check of a user.

Further, for example, the preset function configuration information may specifically be a data type determined according to the function configuration list, that is, the function configuration list is traversed to determine a corresponding data type. Based on this, the first determining unit 304 is further configured to: determine the corresponding controller control according to the data type.

Further, the first determining subunit is further configured to: obtain, in a preset function database, a public function configuration and a particular function configuration that are corresponding to the smart device, and combine the public function configuration and the particular function configuration to generate the corresponding function configuration list.

That is, for each smart device, a public function and a particular function may be set correspondingly. The public function is some basic functions prepared in advance by a system, such as "sending device information by using an application of a mobile phone Q", "standby/opening device". However, the particular function requires a vendor to fill in data interface information, and may include: a function name, a data type, whether the function is visible to a user (yes, no), a function type (display, control), a historical data chart (display, not display), function description, and/or the like.

For example, the preset function database is first pulled. A public function list (that is, public function configuration) corresponding to a device type and a particular function list (particular function configuration) corresponding to the device type are pulled in the preset function database. Then, the public function configuration and the particular function configuration are combined to generate a corresponding function configuration list. Finally, the function configuration list is traversed to determine a data type of function data.

It may be understood that, the determining a corresponding data type based on a traversal result varies, and for example, the second determining subunit is further configured to:

determine that a function type of a function indicated in the function configuration list is a control type or a data display type.

determine a data type of the function if it is determined that the function type of the function indicated in the function configuration list is a control type; and obtain historical data of the smart device if it is determined that the function type of the function indicated in the function configuration list is the data display type, and determine a data type of the historical data.

That is, functions (including a public function and a particular function) indicated in the function configuration list are traversed, so as to determine its function type is a control type or a data display type.

Further, for example, a type of a corresponding display control may be determined according to the function type. The control type control may specifically include a switch button, a selector, a slider, and/or the like. A data display type control includes chart display, text display, and/or the like.

Then, the data type may be parsed to determine the corresponding controller control.

In this embodiment of the present disclosure, the second determining subunit determines the data type of the historical data, and is further configured to:

determine the data type of the historical data in a preset data type set, where the data type set includes one or a combination of more than two of Bool, Int, Float, String, Enum, URL, and Time; and each piece of historical data corresponds to a data type.

Based on this, the first determining unit 304 is configured to: parse the data type according to a preset rule, to determine the corresponding controller control.

Optionally, the apparatus for controlling a smart device may further include:

a third determining unit, configured to determine whether the function indicated in the function configuration list is visible to a user;

a first trigger unit, configured to trigger, if it is determined that the function indicated in the function configuration list is visible to the user, the second determining subunit to perform the step of determining that a function type of a function indicated in the function configuration list is a control type or a data display type; and a hiding unit, configured to hide the function if it is determined that the function indicated in the function configuration list is invisible to the user.

That is, whether the functions (including the public function and the particular function) indicated in the function configuration list are visible to the user may be determined according to default settings or according to vendor settings. That is, whether the functions are needed is determined. If the functions are visible to the user, determine that the function type is a control type or a data display type; and if the functions are invisible to the user, hide the functions.

Based on this, the generation unit 305 is configured to generate a controller template based on the controller control. The control unit 306 is configured to control the smart device by using the controller template.

For example, the controller control determined according to each type of data transmitted by the smart device may form a controller template corresponding to the smart device, so as to control the smart device by using the controller template, to complete data interconnection between the smart device and the controller template.

It may be understood that, the apparatus further may include:

a third obtaining unit, configured to obtain an adjustment instruction; and a configuration unit, configured to perform attribute adjustment on the controller template according to the adjustment instruction.

That is, after the controller template is generated, the user may further perform personalized modification on attributes such as a pattern, sorting, and color changing of a control, and may also add or configure new attributes, and the like.

In this embodiment of the present disclosure, for example, a platform system may be configured as a generation transit station of the controller template. After each type of data transmitted by the smart device is determined, the system may automatically generate the controller template. The three nodes: the smart device, the controller template, and the cloud server are interconnected.

During specific implementation, the foregoing units may be implemented as independent entities, or may be randomly combined to be implemented as a same entity or several entities. For specific implementation of the foregoing units, reference may be made to the foregoing method embodiment. Details are not described herein again.

The apparatus for controlling a smart device may be specifically integrated in a network device such as a server or a gateway.

As can be known from the foregoing, in the apparatus for controlling a smart device provided in this embodiment, first a smart device is controlled to be connected to the Internet of Things network according to basic information of the smart device; preset function configuration information corresponding to the smart device is obtained in a status of the smart device being connected to the Internet of Things network, to determine a corresponding controller control; then a controller template corresponding to the smart device is generated based on the determined controller control, and finally the smart device is controlled by using the controller template. That is, in the embodiments of the present disclosure, the controller template is automatically and uniformly generated based on the function configuration information corresponding to the smart device, thereby completing data interconnection between the smart device and the controller template, so that unification between a controller and a test system is ensured, and compatibility of multi-device control is further improved.

In the above embodiments, the description of each embodiment has its emphasis, and some embodiments may not be detailed. Reference may be made to the detailed description of the foregoing method for controlling a smart device.

The apparatus for controlling a smart device provided in this embodiment of the present disclosure may be a computer, a tablet computer, a mobile phone with a touch function. The apparatus for controlling a smart device and the method for controlling a smart device in the foregoing embodiment are based on the same conception, and any method provided in the embodiment of the method for controlling a smart device may be operated on the apparatus for controlling a smart device. For the specific implementation process, refer to the embodiment of the method for controlling a smart device for details, and details are not described herein again.

It is noted that, for the method for controlling a smart device in the embodiments of the present disclosure, a person of ordinary skill in the art can understand that the whole or part of a process of the method for controlling a smart device in the embodiments of the present disclosure may be implemented by a computer program instructing relevant hardware. The computer program may be stored in a computer-readable storage medium, such as a memory of a terminal, and executed by at least one processor in the terminal. The implementation procedure may include the foregoing processes of the embodiments of the method for controlling a smart device. The storage medium may be a magnetic disk, an optical disc, a read-only memory (ROM), a random access memory (RAM), or the like.

For the apparatus for controlling a smart device in the embodiments of the present disclosure, the functional modules thereof may be integrated into one processing chip, or each module may exist separately and physically, or two or more modules may be integrated into one module. The integrated module may be implemented in the form of hardware, or may be implemented in the form of a software functional module. When the integrated modules are implemented in a form of a software functional module and sold or used as an independent product, the modules may be stored in a computer-readable storage medium. The storage medium is, for example, a read-only memory, a magnetic disk, or an optical disc.

It is noted that the various modules, submodules, units, subunits, and components in the present disclosure can be implemented using any suitable technology. In an example, a module or a unit can be implemented using integrated circuit (IC). In another example, a module or a unit can be implemented as processing circuitry executing software instructions. In another example, interface circuitry is used to implement a receiving unit and/or sending unit.

Correspondingly, an embodiment of the present disclosure further provides a computer storage medium which stores a computer program, where the computer program is used to perform the method for controlling a smart device in the embodiments of the present disclosure.

The foregoing describes a method and an apparatus for controlling a smart device, and a computer storage medium provided in the embodiments of the present disclosure. Although the principles and implementation manners of the present disclosure are described through specific examples in this specification, the descriptions of the embodiments are intended to help understand the method and core ideas of the present disclosure. Meanwhile, a person of ordinary skill in the art may make modifications to the specific implementation modes and application scopes according to the ideas of the present disclosure. To conclude, the content of the specification should not be construed as a limitation to the present disclosure.

What is claimed is:

1. A method for controlling a smart device, comprising:
receiving, by interface circuitry of a user device for controlling the smart device, basic information of the smart device that enables a connection of the smart device into an Internet of Things network;
providing a control signal to the smart device via the interface circuitry to control, according to the basic information, the smart device to connect into the Internet of Things network;
obtaining a preset function configuration of the smart device when the smart device is connected into the Internet of Things network, the preset function configuration identifying a function of the smart device; and
when a function type of the function is a control type,
determining a control component to enable a control of the smart device according to a data type of the function that is identified in the preset function configuration,
generating, for a user interface, a controller template that includes the control component of the control type that corresponds to the data type of the function, and
controlling the smart device based on an operation on the control component in the user interface, wherein
the obtaining the preset function configuration of the smart device includes obtaining a function configuration list corresponding to the smart device, the function configuration list including the preset function configuration, and
the obtaining the function configuration list includes
obtaining, in a preset function database, a public function configuration that is common to the smart device and other smart devices and a particular function configuration that is specific to the smart device; and
combining the public function configuration and the particular function configuration to generate the function configuration list.

2. The method according to claim 1, further comprising:
determining the data type of the function based on the preset function configuration included in the function configuration list.

3. The method according to claim 2, further comprising:
determining the function type of the function that is indicated by the function configuration list.

4. The method according to claim 3, further comprising:
determining the data type of the function when the function type is determined to be the control type.

5. The method according to claim 3, further comprising:
obtaining historical data of the smart device when the function type of the function is determined to be a data display type; and
determining the data type of the function based on the historical data.

6. The method according to claim 5, further comprising:
determining a data type set that is a combination of one or more of Bool, Int, Float, String, Enum, URL, and Time; and
parsing the data type set according to a preset rule to determine the control component.

7. The method according to claim 3, wherein before the determining the function type, the method further comprises:
determining whether the function indicated in the function configuration list is visible to a user;
determining the function type when the function is determined to be visible to the user; and
hiding the function when the function is determined to be invisible to the user.

8. The method according to according to claim 1, wherein after the generating the controller template, the method further comprises:
receiving an adjustment instruction; and
performing attribute adjustment of the controller template according to the adjustment instruction.

9. The method according to claim 1, wherein the determining the control component comprises:
determining the data type of the function based on historical data of the smart device.

10. An apparatus for controlling a smart device, comprising:
interface circuitry configured to receive information from the smart device and transmit control signals to the smart device; and
processing circuitry configured to:
receive, via the interface circuitry, basic information of the smart device that enables a connection of the smart device into an Internet of Things network;
provide a control signal to the smart device via the interface circuitry to control, according to the basic information, the smart device to connect into the Internet of Things network;
obtain a preset function configuration of the smart device when the smart device is connected into the Internet of Things network, the preset function configuration identifying a function of the smart device; and
when a function type of the function is a control type,
determine a control component to enable a control of the smart device according to a data type of the function that is identified in the preset function configuration,
generate, for a user interface, a controller template that includes the control component of the control type that corresponds to the data type of the function, and
control the smart device based on an operation on the control component in the user interface, wherein the processing circuitry is further configured to
obtain a function configuration list corresponding to the smart device, the function configuration list including the preset function configuration,
obtain, in a preset function database, a public function configuration that is common to the smart device and other smart devices and a particular function configuration that is specific to the smart device, and
combine the public function configuration and the particular function configuration to generate the function configuration list.

11. The apparatus according to claim 10, wherein the processing circuitry is configured to:
determine the data type of the function based on the preset function configuration included in the function configuration list.

12. The apparatus according to claim 11, wherein the processing circuitry is configured to:
determine the function type of the function that is indicated by the function configuration list.

13. The apparatus according to claim 12, wherein the processing circuitry is configured to:
determine the data type of the function when the function type is determined to be the control type.

14. The apparatus according to claim 12, wherein the processing circuitry is configured to:
obtain historical data of the smart device when the function type of the function is determined to be a data display type; and
determine the data type of the function based on the historical data.

15. The apparatus according to claim 14, wherein the processing circuitry is configured to:
determine a data type set that is a combination of one or more of Bool, Int, Float, String, Enum, URL, and Time; and
parse the data type set according to a preset rule to determine the control component.

16. The apparatus according to claim 12, wherein the processing circuitry is configured to:
determine whether the function indicated in the function configuration list is visible to a user;
determine the function type when the function is determined to be visible to the user; and
hide the function when the function is determined to be invisible to the user.

17. The apparatus according to according to claim 10, wherein the processing circuitry is configured to:
receive an adjustment instruction; and
perform attribute adjustment of the controller template according to the adjustment instruction.

18. The apparatus according to claim 10, wherein the processing circuitry is configured to:
determine the data type of the function based on historical data of the smart device.

* * * * *